(12) United States Patent
Imaizumi et al.

(10) Patent No.: US 8,459,959 B2
(45) Date of Patent: Jun. 11, 2013

(54) CONTROL DEVICE OF HYDRAULICALLY DRIVEN FAN

(75) Inventors: Masaaki Imaizumi, Mooka (JP); Katsuhiro Ikegami, Hiratsuka (JP); Yosahitaka Onodera, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 310 days.

(21) Appl. No.: 12/935,101

(22) PCT Filed: Mar. 24, 2009

(86) PCT No.: PCT/JP2009/055736
§ 371 (c)(1),
(2), (4) Date: Sep. 28, 2010

(87) PCT Pub. No.: WO2009/122950
PCT Pub. Date: Oct. 8, 2009

(65) Prior Publication Data
US 2011/0014062 A1    Jan. 20, 2011

(30) Foreign Application Priority Data
Mar. 31, 2008  (JP) .................................. 2008-092242

(51) Int. Cl.
F04B 49/00    (2006.01)
(52) U.S. Cl.
USPC .................... 417/46; 417/42; 60/329; 60/422
(58) Field of Classification Search
USPC .................. 417/42, 46; 60/329, 422
See application file for complete search history.

(56) References Cited

U.S. PATENT DOCUMENTS
7,275,368 B2 *  10/2007  Furuta et al. .................... 60/329

FOREIGN PATENT DOCUMENTS
| JP | 55-83901 | 6/1980 |
| JP | 60-57402 | 4/1985 |
| JP | 64-79804 | 3/1989 |
| JP | 2000-130164 | 5/2000 |
| JP | 2005-76525 A1 | 3/2005 |

OTHER PUBLICATIONS

International Search Report for International Application No. PCT/JP2009/055736 dated Jun. 10, 2009.

* cited by examiner

Primary Examiner — Charles Freay
Assistant Examiner — Patrick Hamo
(74) Attorney, Agent, or Firm — Kratz, Quintos & Hanson, LLP

(57) ABSTRACT

Disclosed is a control device of a hydraulically driven fan. The control device of a hydraulically driven fan is characterized by comprising first command value calculation means for calculating a fan speed command by a proportional term only while a difference between a target valve controlled variable and an actual valve controlled variable is not smaller than a predetermined threshold, second command value calculation means for calculating a fan speed command by the proportional term and an integral term while a difference between a target valve controlled variable and an actual valve controlled variable is smaller than a predetermined threshold, target valve controlled variable calculation means for calculating a target valve controlled variable of a control valve based on the calculated fan speed command, and control means for outputting a valve controlled variable to a control valve such that the control valve reaches the target valve controlled variable.

6 Claims, 8 Drawing Sheets

CONTROL CHARACTERISTICS OF EMBODIMENT AND COMPARATIVE EXAMPLES

COMPARATIVE EXAMPLE

OPEN CONTROL (WITHOUT PRESCRIBED PROCESSING OF CONTROLLED VARIABLE)

COMPARATIVE EXAMPLE

FEEDBACK CONTROL PI CONTROL (WITHOUT PRESCRIBED PROCESSING OF CONTROLLED VARIABLE)

EMBODIMENT (WITH PRESCRIBED PROCESSING OF CONTROLLED VARIABLE)

CONTROL DEVICE OF HYDRAULICALLY DRIVEN FAN

TECHNICAL FIELD

The present invention relates to a control device of a hydraulically driven fan.

BACKGROUND ART

The hydraulically driven fan is mounted on a construction machine to blow into a radiator and an oil cooler.

Patent Reference 1 describes a control device of a hydraulically driven fan provided with an engine, a variable displacement hydraulic pump driven by the engine, a hydraulic motor driven by hydraulic oil supplied from the variable displacement hydraulic pump, a hydraulically driven fan driven by the hydraulic motor, a control valve for controlling a swash plate of the variable displacement hydraulic pump, and a controller for sending an electric current command to the control valve. And, when an engine water temperature, a hydraulic oil temperature and a number of engine rotations are inputted into the controller, the controller calculates a target fan speed corresponding to the engine water temperature, the hydraulic oil temperature and the number of engine rotations, generates an electric current command necessary to set the target fan speed, and sends it to the control valve to match the actual fan speed with the target fan speed by open-loop control.

Patent Reference 2 describes a control device of a hydraulically driven fan configured in the same manner as in Patent Reference 1. In Patent Reference 2, to prevent peak pressure from occurring inside an oil passage ranging from a hydraulic pump to a hydraulic motor or an outlet pressure of the hydraulic motor from causing pressure hunting, the electric current command is sent to the control valve to retain a minimum fan speed for a prescribed time at the time of starting the engine and subsequently to gradually increase the fan speed until reaching the target fan speed. Patent Reference 2 controls the fan speed by feedback control or PI control (proportional integral control).

DISCLOSURE OF THE INVENTION

Problems to be Solved by the Invention

Patent Reference 1 can not control the actual fan speed exactly because the actual fan speed is matched with the target fan speed by the open-loop control.

Under the circumstances described above, for precise control of the fan speed, it is considered to perform feedback control so that a control deviation between the target fan speed and the actual fan speed becomes zero by detecting the actual fan speed. For the feedback control of the fan speed, it is necessary to use at least PI (proportional integral) control to actively eliminate the control deviation and to match with a target value with good controllability without causing a steady-state deviation even if there is disturbance. The PI (proportional, integral) control here is a control that the operation amount in a control system is controlled by using a proportional action and an integral action with respect to the control deviation as known well.

But, when the feedback control and the PI control are merely applied to a control of the fan speed, peak pressure and pressure hunting tend to occur in the hydraulic circuit. It is because when the feedback control and the PI control are used, the electric current command to be sent to the control valve becomes better in responsiveness, and the discharge flow rate of the variable displacement hydraulic pump becomes easy to change. Therefore, the peak pressure becomes easy to occur in the oil passage from the hydraulic pump to the hydraulic motor, or the outlet pressure of the hydraulic motor becomes easy to induce pressure hunting. If the peak pressure or the pressure hunting occurs, hydraulic equipment such as a hydraulic motor configuring the hydraulic circuit is adversely affected.

And, Patent Reference 2 merely increases the target fan speed gradually. Here, the discharge flow rate of the hydraulic pump is influenced by not only the fan speed but also the number of engine rotations. Therefore, in Patent Reference 2 which performs the feedback control and the PI control, when the number of engine rotations varies, an electric current command which is sent to the control valve is changed accordingly, and the discharge flow rate of the variable displacement hydraulic pump is varied. Therefore, Patent Reference 2 cannot control the occurrence of peak pressure or pressure hunting when the number of engine rotations is varied.

The present invention has been made in view of the above circumstances and makes it possible to match exactly the actual fan speed of the hydraulically driven fan with the target fan speed when it is controlled to the target fan speed and suppresses the occurrence of peak pressure or pressure hunting in a hydraulic circuit.

Means for Solving the Problem

According to a first aspect of the invention, the control device of a hydraulically driven fan is provided with a hydraulic motor, a hydraulically driven fan driven by the hydraulic motor and a control valve for varying a flow rate of a hydraulic oil supplied to the hydraulic motor according to a valve controlled variable, wherein a fan speed command is feedback-controlled in a manner that at least a proportional action and an integral action are used with respect to a control deviation between a target fan speed and an actual fan speed of the hydraulically driven fan, the control device comprising:

a first command value calculation unit for calculating the fan speed command by using, from a proportional term and an integral term, the proportional term only while a difference between a target valve controlled variable and an actual valve controlled variable is not smaller than a predetermined threshold,
  a second command value calculation unit for calculating the fan speed command by using both of the proportional term and the integral term while a difference between the target valve controlled variable and the actual valve controlled variable is smaller than the predetermined threshold,
  a target valve controlled variable calculation unit for calculating the target valve controlled variable of the control valve based on the calculated fan speed command, and
  a control unit for outputting the valve controlled variable to the control valve such that the control valve reaches the target valve controlled variable.

According to a second aspect of the invention, the control device of a hydraulically driven fan is provided with a hydraulic motor, a hydraulically driven fan driven by the hydraulic motor and a control valve for varying a flow rate of a hydraulic oil supplied to the hydraulic motor according to a valve controlled variable, wherein a fan speed command is feedback-controlled in a manner that at least a proportional action and an integral action are used with respect to a control deviation between a target fan speed and an actual fan speed of the hydraulically driven fan, the control device comprising:

a target valve controlled variable calculation unit for calculating a target valve controlled variable of the control valve based on the fan speed command, and a control unit for outputting the valve controlled variable to the control valve such that the control valve gradually reaches toward the target valve controlled variable with a prescribed variation per prescribed unit time.

According to a third aspect of the invention, the control device of a hydraulically driven fan according to the first aspect of the invention is characterized by the control unit which outputs the valve controlled variable to the control valve such that the control valve gradually reaches toward the target valve controlled variable with a prescribed variation per prescribed unit time.

According to the present invention, when the difference between the target valve controlled variable and the actual valve controlled variable is not less than the predetermined threshold, and when it is necessary to largely move the control valve, the integral action is stopped. Therefore, it is possible to inhibit the control valve (the swash plate of the hydraulic pump) from moving largely as a result of the integral action, thereby inhibiting the flow rate supplied to the hydraulic motor from varying largely. Thus, the occurrence of peak pressure or pressure hunting in the hydraulic circuit can be suppressed.

Meanwhile, when the difference between the target valve controlled variable and the actual valve controlled variable becomes smaller than the predetermined threshold and when it is not necessary to largely move the control valve (not necessary to largely move the swash plate of the hydraulic pump), integral action is used, so that the control deviation is actively eliminated by the integral action, and the actual fan speed can be matched with the target fan speed with good controllability without causing a steady-state deviation even if there is disturbance.

As described above, the present invention can match exactly the actual fan speed of the hydraulically driven fan with the target fan speed when it is controlled to the target value. And, peak pressure or pressure hunting can be suppressed from occurring in the hydraulic circuit.

According to the second aspect of the invention, the valve controlled variable is outputted to the control valve so as to reach gradually the target valve controlled variable with a prescribed variation per prescribed unit time.

Therefore, even when it is normally necessary to largely move the control valve (when it is necessary to largely move the swash plate of the hydraulic pump), a moving amount per unit time of the control valve is limited, so that it is possible to inhibit the control valve from moving largely (inhibit the swash plate of the hydraulic pump from moving largely), thereby inhibiting a flow rate supplied to the hydraulic motor from varying largely. Thus, the occurrence of peak pressure or pressure hunting in the hydraulic circuit can be suppressed.

In addition, since feedback control and PI control are performed, a control deviation is actively eliminated by an integral action, a steady-state deviation is caused not to occur even if there is disturbance, and the actual fan speed can be matched with the target fan speed with good controllability.

According to the third aspect of the invention, the control unit of the first aspect of the invention outputs the valve controlled variable to the control valve so as to gradually reach toward the target valve controlled variable with a prescribed variation per prescribed unit time similar to the second aspect of the invention.

Therefore, even when it is normally necessary to largely move the control valve (when it is necessary to largely move the swash plate of the hydraulic pump), the moving amount per unit time of the control valve is limited, so that it is possible to inhibit the control valve from moving largely (inhibit the swash plate of the hydraulic pump from moving largely), thereby inhibiting the flow rate supplied to the hydraulic motor from varying largely. Thus, the occurrence of peak pressure or pressure hunting in the hydraulic circuit can be suppressed furthermore.

And, the above-described to-be-solved issue is achieved by the following control method for a hydraulically driven fan using a control device of a hydraulically driven fan which is provided with a hydraulic motor, a hydraulically driven fan driven by the hydraulic motor and a control valve for varying a flow rate of hydraulic oil to be supplied to the hydraulic motor according to an applied valve controlled variable, in which a fan speed command is feedback-controlled according to a control deviation between a target fan speed and an actual fan speed of the hydraulically driven fan, the method comprising:

a) calculating the target fan speed based on an engine water temperature, a hydraulic oil temperature and a number of engine rotations, detecting the actual fan speed, and calculating a difference between the target fan speed and the actual fan speed as a control deviation, b) controlling the control valve by calculating a target valve controlled variable based on the target fan speed when the actual fan speed is zero, and calculating the valve controlled variable to gradually reach toward the calculated target valve controlled variable with a prescribed variation per prescribed unit time, c) calculating the fan speed command by using a proportional action based on the control deviation while the difference between the target valve controlled variable and an actual valve controlled variable is not smaller than a predetermined threshold, d) calculating the fan speed command by using the proportional action and an integral action based on the control deviation while the difference between the target valve controlled variable and the actual valve controlled variable is smaller than the predetermined threshold, and e) controlling the control valve by calculating the target valve controlled variable based on the calculated fan speed command and calculating the valve controlled variable to gradually reach toward the calculated target valve controlled variable with a prescribed variation per prescribed unit time.

And, the above-described to-be-solved issue is achieved by the following control method for a hydraulically driven fan described above, wherein in the step of calculating the fan speed command the target valve controlled variable is the target fan speed and the actual valve controlled variable is the actual fan speed.

The above-described to-be-solved issue is achieved by the following control method for a hydraulically driven fan described above, wherein:

a cycle number to gradually reach toward the calculated fan speed command with a prescribed variation per prescribed unit time is calculated, the fan speed command is calculated by using the proportional action while the cycle number is larger than a predetermined threshold, and the fan speed command is calculated by using the proportional action and the integral action while the cycle number is not larger than the predetermined threshold, and a final cycle number is updated by subtracting 1 from the cycle number when the cycle number is calculated.

ADVANTAGEOUS EFFECTS OF THE INVENTION

According to the present invention, when the actual fan speed of the hydraulically driven fan is controlled to the target fan speed, the actual fan speed can be exactly matched with the target fan speed, and the occurrence of peak pressure or pressure hunting in the hydraulic circuit can be suppressed.

LIST OF REFERENCE NUMERALS

Figure 1:
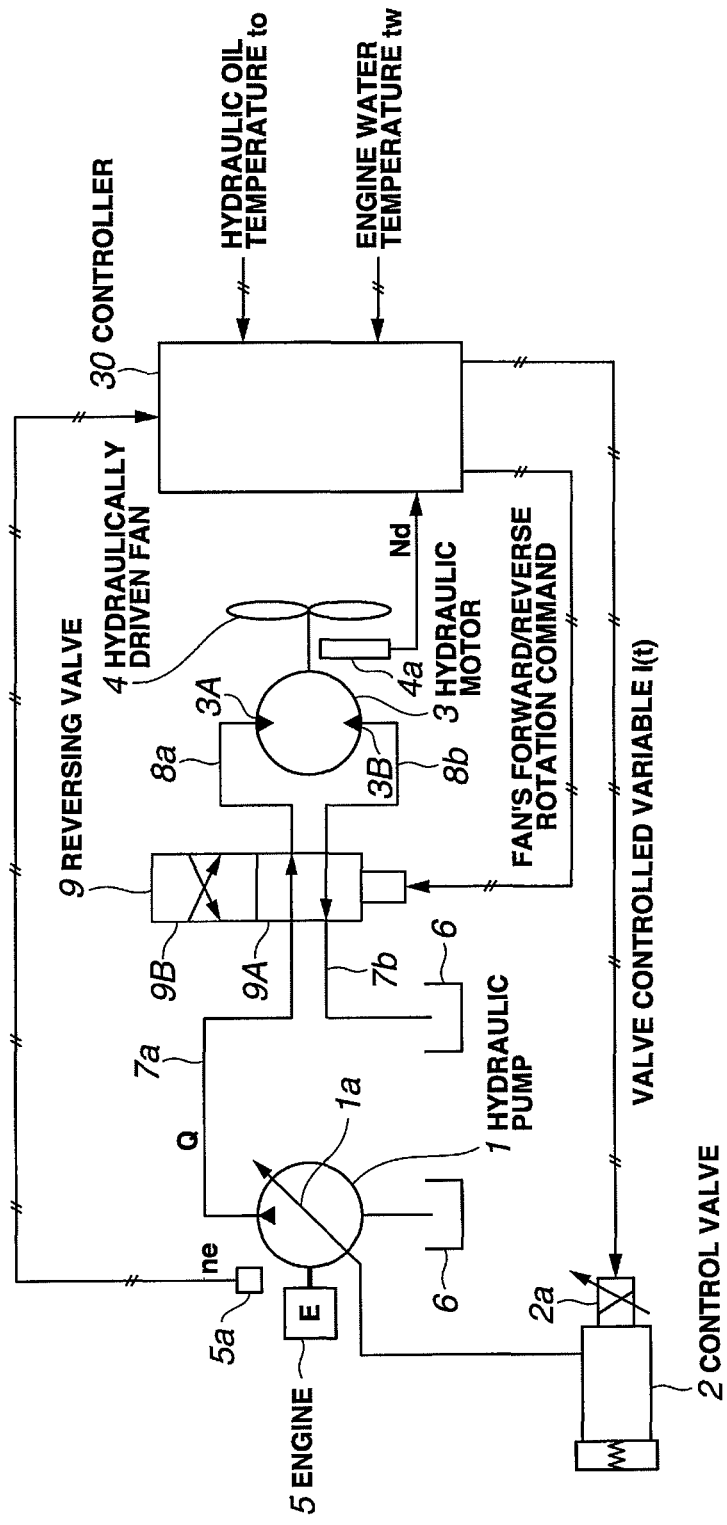
FIG. 1 is a diagram showing a hydraulic circuit according to an embodiment.

1: Hydraulic pump
2: Control valve
3: Hydraulic motor
4: Hydraulically driven fan
31: First command value calculation unit
32: Second command value calculation unit
33: Target valve controlled variable calculation unit
34: Control unit

BEST MODE FOR CARRYING OUT THE INVENTION

Embodiments of the control device of a hydraulically driven fan according to the present invention are described below with reference to the drawings.
Embodiment 1

FIG. 1 shows a hydraulic circuit of the embodiment. For example, the hydraulic circuit shown in FIG. 1 is mounted on a construction machine such as a hydraulic shovel.

A hydraulic pump 1 is driven by an engine 5 used as a drive source. The output shaft of the engine 5 is provided with an engine speed sensor 5a for detecting an actual number of rotations ne of the engine 5.

The hydraulic pump 1 is a variable displacement hydraulic pump, and when a swash plate 1a varies, a displacement volume, namely a capacity q (cc/rev), varies.

The swash plate 1a of the hydraulic pump 1 is driven by a control valve 2. The control valve 2 is driven when a valve controlled variable I is applied, and changes the swash plate 1a according to the valve controlled variable I. The valve controlled variable I is outputted in a form of a command current to an electromagnetic solenoid 2a of the control valve 2.

The hydraulic pump 1 sucks the oil from a tank 6 and discharges a hydraulic oil having a discharge flow rate Q (l/min) to a discharge oil passage 7a through a hydraulic oil discharge port. A return oil passage 7b is communicated with the tank 6.

A hydraulic motor 3 is a fixed displacement hydraulic motor and has individual flow in/out ports 3A and 3B. The individual flow in/out ports 3A and 3B are The output shaft of the hydraulic motor 3 is connected with the rotation shaft of a hydraulically driven fan 4. The rotation shaft of the hydraulically driven fan 4 is provided with a fan speed sensor 4a for detecting an actual fan speed Nd of the hydraulically driven fan 4.

A reversing valve 9 is interposed between the individual flow in/out oil passages 8a and 8b and the discharge oil passage 7a and the return oil passage 7b. The reversing valve 9 changes its valve position to a control position 9A or 9B according to a fan's forward/reverse rotation command. When the reversing valve 9 is controlled to the control position 9A, the discharge oil passage 7a and the flow in/out oil passage 8a are communicated with each other and the flow in/out oil passage 8b and the return oil passage 7b are communicated with each other as shown in FIG. 1. Therefore, the hydraulic oil having the flow rate Q which is discharged from the hydraulic pump 1 flows into the flow in/out port 3A of the hydraulic motor 3, and the hydraulic oil flown out of the flow in/out port 3B of the hydraulic motor 3 is returned to the tank 6. Thus, the hydraulic motor 3 rotates in the forward direction, and the hydraulically driven fan 4 is accordingly driven to rotate in the forward direction. Meanwhile, when the reversing valve 9 is controlled to the control position 9B, the discharge oil passage 7a and the flow in/out oil passage 8b are communicated with each other, and the flow in/out oil passage 8a and the return oil passage 7b are communicated with each other. Therefore, the hydraulic oil having the flow rate Q discharged from the hydraulic pump 1 flows into the flow in/out port 3B of the hydraulic motor 3, and the hydraulic oil flown out of the flow in/out port 3A of the hydraulic motor 3 is returned to the tank 6. Thus, the hydraulic motor 3 rotates in a reverse rotation direction, and the hydraulically driven fan 4 is accordingly driven to rotate in the reverse rotation direction.

The control valve 2 shown in FIG. 1 controls the swash plate 1a of the hydraulic pump 1 to achieve a function of changing the flow rate Q of the hydraulic oil supplied to the hydraulic motor 3.
Embodiment 2

Figure 2:
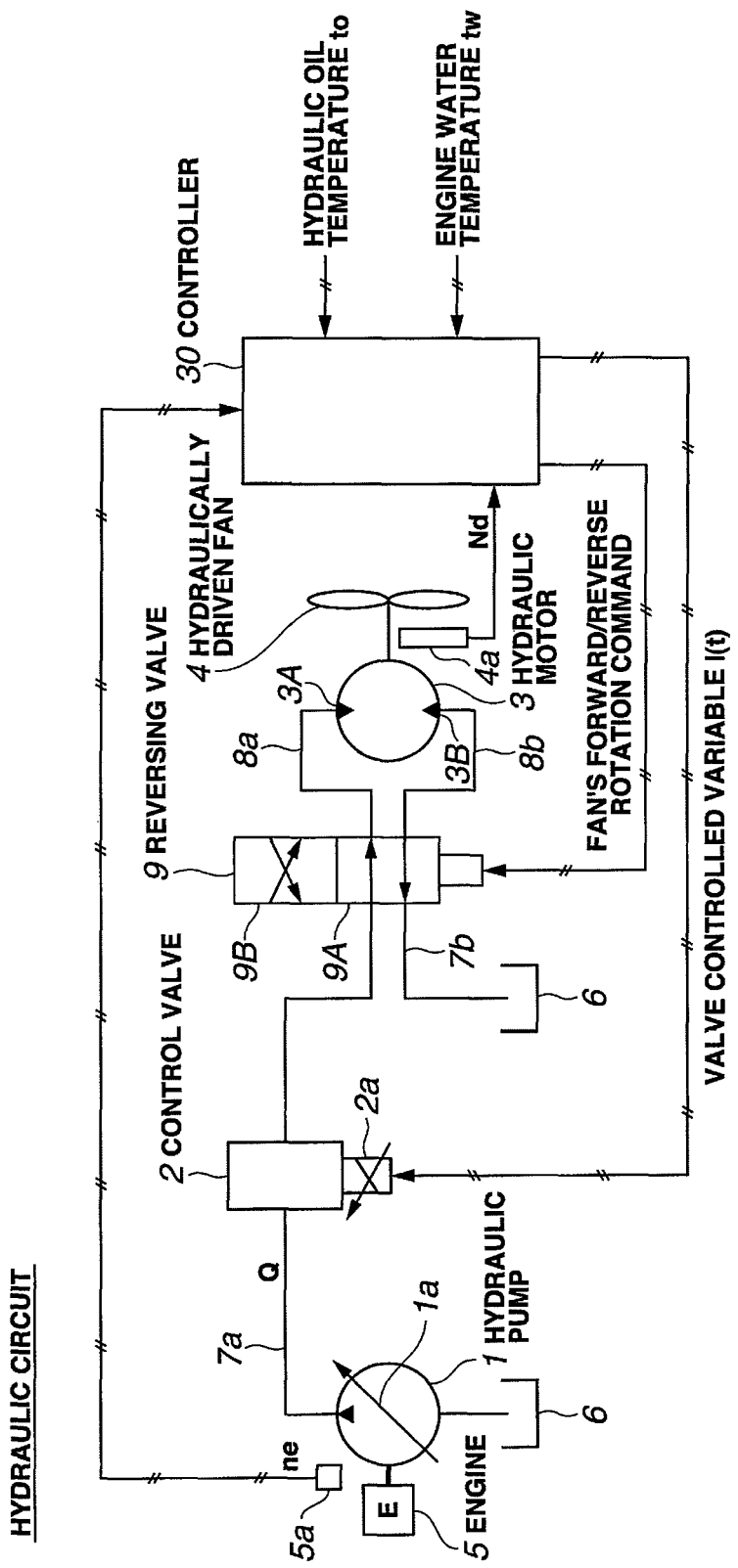
FIG. 2 is a diagram showing another structure embodiment of the hydraulic circuit.

FIG. 2 shows another hydraulic circuit structure embodiment provided with the control valve 2 having the same function at a position different from FIG. 1.

In other words, the hydraulic circuit shown in FIG. 2 is provided with the control valve 2 for controlling a degree of opening of the discharge oil passage 7a at a middle part of the discharge oil passage 7a. The control valve 2 shown in FIG. 2 achieves a function of changing the flow rate Q of the hydraulic oil supplied to the hydraulic motor 3 by controlling the degree of opening of the discharge oil passage 7a.
Embodiment 3

Figure 3:
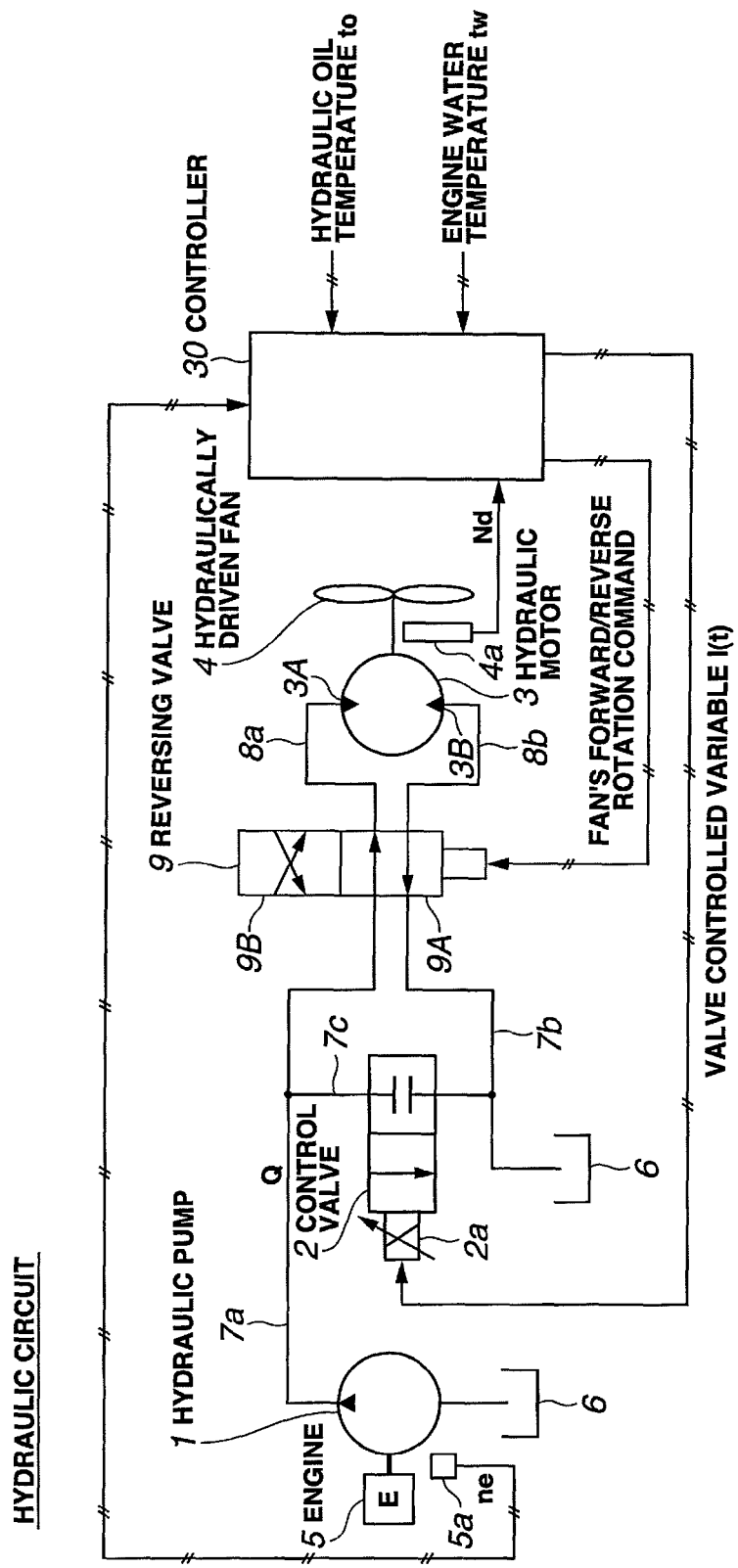
FIG. 3 is a diagram showing another structure embodiment of the hydraulic circuit.

Similarly, FIG. 3 also shows another hydraulic circuit structure embodiment provided with the control valve 2 having the same function at a position different from FIG. 1 and FIG. 2. The hydraulic pump 1 of FIG. 3 is determined to be a fixed displacement type.

In other words, the hydraulic circuit shown in FIG. 3 is provided with an oil passage 7c, which communicates the discharge oil passage 7a and the return oil passage 7b mutually, and the control valve 2 for controlling an oil amount of the oil bypassed from the discharge oil passage 7a to the return oil passage 7b disposed at a middle part of the oil passage 7c. The control valve 2 shown in FIG. 3 achieves a function of changing the flow rate Q of the hydraulic oil supplied to the hydraulic motor 3 by controlling the oil amount of the oil bypassed from the discharge oil passage 7a to the return oil passage 7b.

Figure 4:
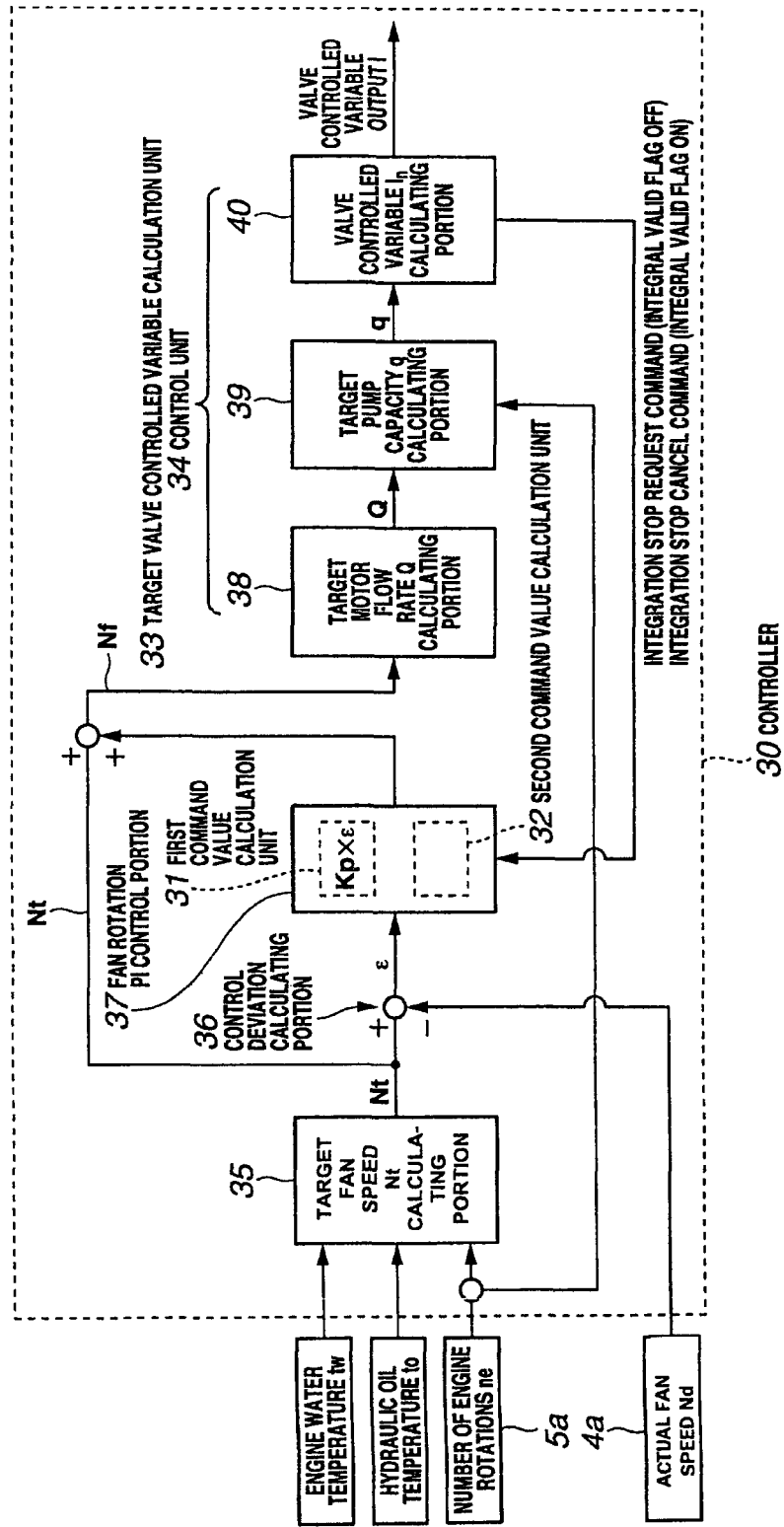
FIG. 4 is a control block view of the embodiment.

FIG. 4 shows a control block diagram of an embodiment.

As shown in FIG. 4, sensors for detecting a hydraulic oil temperature to and an engine water temperature tw are disposed in addition to the sensor 5a for detecting the number of engine rotations ne and the sensor 4a for detecting the fan speed Nd. The detection values detected by the individual sensors are inputted to a controller 30.

The controller 30 comprises a target fan speed calculating portion 35, a control deviation calculating portion 36, a fan speed PI control portion 37, a target motor flow rate calculating portion 38, a target pump capacity calculating portion 39, and a valve controlled variable calculating portion 40.

The target fan speed calculating portion 35 calculates a target fan speed Nt of the hydraulically driven fan 4 on the basis of the engine water temperature tw, the hydraulic oil temperature to and the number of engine rotations ne. A unique relationship is established between the target fan speed Nt of the hydraulically driven fan 4 and the engine water temperature tw, the hydraulic oil temperature to and the number of engine rotations ne. Based on the unique relationship, the target fan speed calculating portion 35 calculates the target fan speed Nt corresponding to the present individual detection values of the engine water temperature tw, the hydraulic oil temperature to, and the number of engine rotations ne.

The control deviation calculating portion 36 calculates control deviation $\epsilon$ (=Nt−Nd) between the target fan speed Nt and the actual fan speed Nd.

The fan rotation PI control portion 37 is disposed to make a fan speed command Nf use a proportional action and an integral action with respect to the control deviation $\epsilon$ between the target fan speed Nt and the actual fan speed Nd.

The fan rotation PI control portion 37 is provided with a first command value calculation unit 31 and a second command value calculation unit 32.

As described later, in a case where an integration stop request command is inputted, the first command value calculation unit 31 does not perform integration of $\int \epsilon$ in integral term $Ki \cdot \int \epsilon$ but determines it as a fixed value by retaining the integrated value just before the integration stop request command is inputted (this fixed value is determined as $Z_{n-1}$). Therefore, the fan speed command Nf changes mostly in proportional term $Kp \cdot \epsilon$ only as indicated by the following equation (1).

$$Nf = Nt + Kp \cdot \epsilon + Z_{n-1} \qquad (1)$$

It is to be understood that the phrase "by eliminating an integral term" in one of the claims includes the above-described concept that the integral term $Ki \cdot \int \epsilon$ is not integrated but determined as the fixed value, and the fan speed command Nf is changed by the proportional term $Kp \cdot \epsilon$ only.

When the integration stop request command has been cancelled, namely when an integration stop cancel command has been inputted, the second command value calculation unit 32 calculates the fan speed command Nf by adding the integral term $Ki \cdot \int \epsilon$ to the proportional term $Kp \cdot \epsilon$ as expressed by the following equation (2).

$$Nf = Nt + Kp \cdot \epsilon + Ki \cdot \int \epsilon \qquad (2)$$

In the above equations (1) and (2), Kp is a proportional gain (fixed value), and Ki is an integral gain (fixed value).

The target motor flow rate calculating portion 38 calculates from the fan speed command Nf a target flow rate Q of the hydraulic oil to be supplied to the hydraulic motor 3. In other words, the rotation speed of the rotation shaft of the hydraulically driven fan 4 increases in proportion to the increase of the flow rate Q of the hydraulic oil flowing into the hydraulic motor 3. Thus, a unique proportional relationship is established between the fan speed command Nf and the flow rate Q of the hydraulic oil supplied into the hydraulic motor 3. Based on the unique proportional relationship, the target motor flow rate calculating portion 38 carries out an operation to convert the fan speed command Nf into the target motor flow rate Q to be supplied to the hydraulic motor 3.

The target pump capacity calculating portion 39 calculates from the above-described target motor flow rate Q a target pump capacity q of the hydraulic pump 3. In other words, the relationship as expressed by the following equation (3) is established among the target pump capacity q of the hydraulic pump 1, the number of engine rotations ne and the target motor flow rate Q with a constant denoted by K.

$$Q = q \cdot ne \cdot K \qquad (3)$$

Based on the above relationship, the target pump capacity calculating portion 39 carries out an operation to convert the target motor flow rate Q into the target pump capacity q of the hydraulic pump 3 by using the number of engine rotations ne.

The valve control variable calculating portion is described below. This embodiment is described on the assumption that a fan pump discharge amount increases when a valve controlled variable increases.

The valve controlled variable calculating portion 40 calculates a target valve controlled variable $I_n$, which is to be added to the control valve 2, from the above-described target pump capacity q and outputs the valve controlled variable $I_n$ to the control valve 2. The valve controlled variable calculating portion 40 also judges whether difference $\Delta I$ between the target valve controlled variable $I_n$ and an actual valve controlled variable $I_{n-1}$ is smaller than a predetermined threshold A or not smaller than the threshold value A as expressed by the following equation (4).

$$\Delta I < A (\Delta I = I_n - I_{n-1}) \qquad (4)$$

When it is judged that the difference $\Delta I$ between the target valve controlled variable $I_n$ and the actual valve controlled variable $I_{n-1}$ is not smaller than the predetermined threshold A, the integration stop request command is outputted to the fan rotation PI control portion 37. On the other hand, when it is judged that the difference $\Delta I$ between the target valve controlled variable $I_n$ and the actual valve controlled variable $I_{n-1}$ is smaller than the predetermined threshold A, the integration stop cancel command is outputted to the fan rotation PI control portion 37.

The target motor flow rate calculating portion 38, the target pump capacity calculating portion 39 and the valve controlled variable calculating portion 40 constitute a target valve controlled variable calculation unit 33 and a control unit 34.

The target valve controlled variable calculation unit 33 calculates the target valve controlled variable $I_n$ of the control valve 2 on the basis of the fan speed command Nf calculated by the fan rotation PI control portion 37.

The control unit 34 calculates the valve controlled variable I according to the following equation (5) and outputs to the control valve 2. In other words, the control unit 34 outputs the valve controlled variable I to the control valve 2 so as to gradually reach toward the target valve controlled variable $I_n$ with a prescribed variation $\Delta i$ per prescribed unit time (1 cycle).

$$I = I_{n-1} + \Delta i \quad (5)$$

It is determined that cycle number n increases one per prescribed unit time, $I_{n-1}$ is an actual valve controlled variable (the previous valve controlled variable) and I is the current valve controlled variable. The $\Delta i$ corresponds to the amount of change of the swash plate $1a$ of the hydraulic pump 1 per cycle and is a prescribed fixed value.

Processing performed by the controller 30 shown in FIG. 4 is described below with additional reference to FIG. 5.

Figure 5:
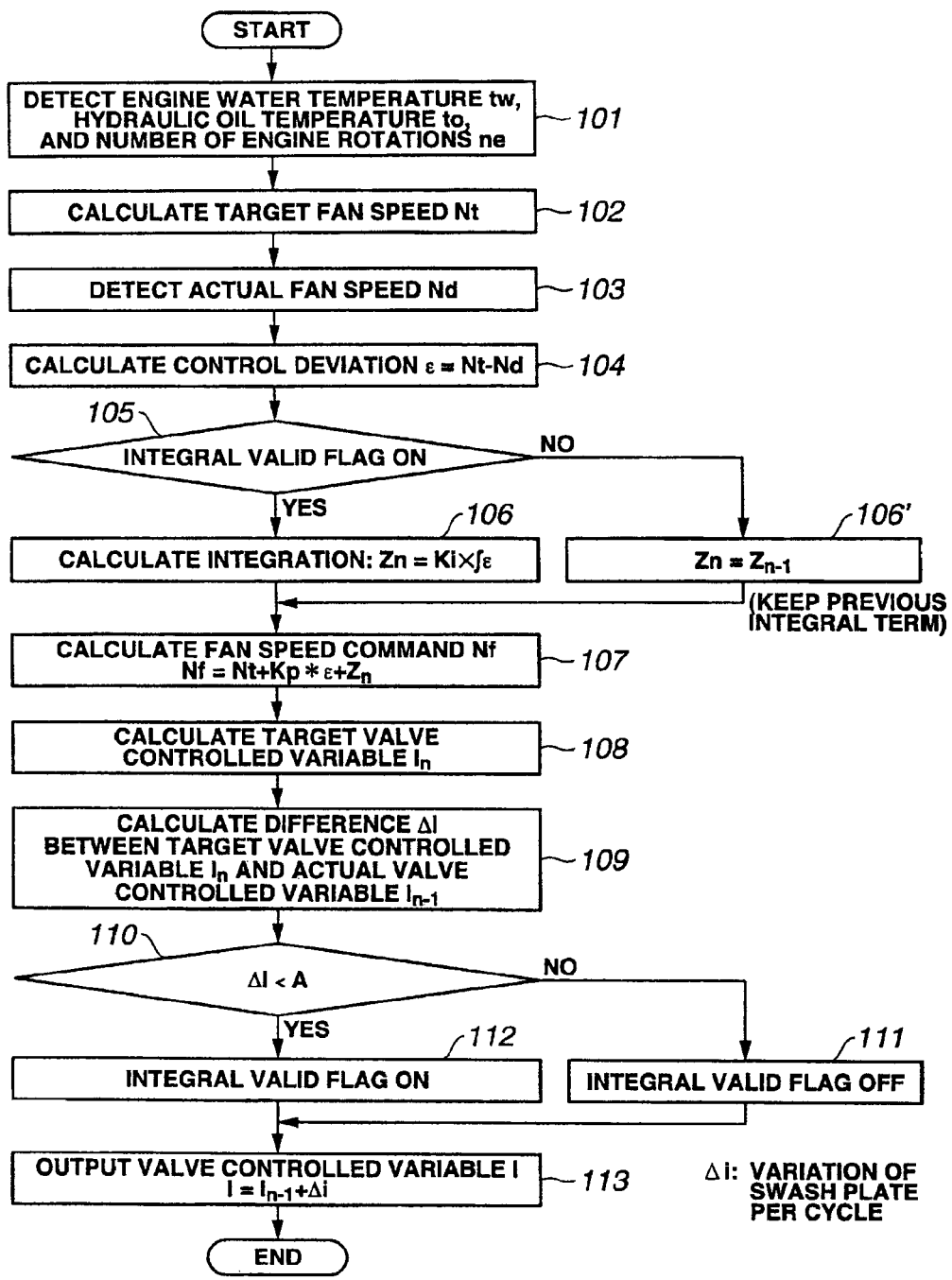
FIG. 5 is a flow chart showing a procedure of processing performed by the controller shown in FIG. 4.

Specifically, the engine water temperature tw, the hydraulic oil temperature to and the number of engine rotations ne are detected by the individual sensors as shown in FIG. 5 and inputted to the target fan speed calculating portion 35 of the controller 30 (step 101).

Then, the target fan speed calculating portion 35 calculates the target fan speed Nt corresponding to the present individual detection values of the engine water temperature tw, the hydraulic oil temperature to and the number of engine rotations ne (step 102).

The actual fan speed Nd is then detected by the fan speed sensor $4a$ and inputted to the control deviation calculating portion 36 (step 103).

If the actual fan speed is zero, the target valve controlled variable is calculated based on the target fan speed, the valve controlled variable is calculated, and the control valve is controlled to gradually reach toward the calculated target valve controlled variable with a prescribed variation per prescribed unit time as described later.

The control deviation calculating portion 36 calculates a control deviation $\epsilon (=Nt-Nd)$ between the target fan speed Nt and the actual fan speed Nd (step 104).

The fan rotation PI control portion 37 judges whether the integration stop request command and the integration stop cancel command have been inputted, and judges whether an integral valid flag is on or off (step 105).

When the integral valid flag is off (judged NO in step 105), the first command value calculation unit 31 of the fan rotation PI control portion 37 does not integrate the $\int \epsilon$ in the deviation integral term $Ki \cdot \int \epsilon$ but determines as a fixed value having retained a value just before the integration stop request command is inputted (this fixed value is determined as $Z_{n-1}$)(step 106'). Therefore, the fan speed command Nf is changed mostly by the deviation proportional term $Kp \cdot \epsilon$ only as expressed by the following equation (1).

$$Nf = Nt + Kp \cdot \epsilon + Z_{n-1} \quad (1)$$

(step 107)

If the integral valid flag is on (judged YES in step 105), the second command value calculation unit 32 of the fan rotation PI control portion 37 adds the deviation integral term $Ki \cdot \int \epsilon$ to the deviation proportional term $Kp \cdot \epsilon$ (step 106) to calculate the fan speed command Nf as expressed by the following equation (2).

$$Nf = Nt + Kp \cdot \epsilon + Ki \cdot \int \epsilon \quad (2)$$

(step 107)

The target valve controlled variable calculation unit 33 (the target motor flow rate calculating portion 38, the target pump capacity calculating portion 39 and the valve controlled variable calculating portion 40) calculates the target valve controlled variable $I_n$ of the control valve 2 by using the number of engine rotations ne detected by the engine speed sensor $5a$ based on the fan speed command Nf calculated by the above-described fan rotation PI control portion 37 (step 108).

The valve controlled variable calculating portion 40 calculates the difference $\Delta I$ between the target valve controlled variable $I_n$ and the actual valve controlled variable $I_{n-1}$ as expressed by the following equation (6) (step 109).

$$\Delta I = I_n - I_{n-1} \quad (6)$$

The valve controlled variable calculating portion 40 then judges whether the difference $\Delta I$ between the target valve controlled variable $I_n$ and the actual valve controlled variable $I_{n-1}$ is smaller than the predetermined threshold A or not smaller than the predetermined threshold A as expressed by the following equation (4).

$$\Delta I = I_n - I_{n-1} < A \quad (4)$$

(step 110)

When it is consequently judged that the difference $\Delta I$ between the target valve controlled variable $I_n$ and the actual valve controlled variable $I_{n-1}$ is not smaller than the predetermined threshold A (judged NO in step 110), the integration stop request command is outputted toward the fan rotation PI control portion 37 to turn off the integration valid flag (step 111).

Meanwhile, when it is judged that the difference $\Delta I$ between the target valve controlled variable $I_n$ and the actual valve controlled variable is smaller than the predetermined threshold A (judged YES in step 110), the integration stop cancel command is outputted toward the fan rotation PI control portion 37 to turn on the integral valid flag (step 112).

The control unit 34 then calculates the present valve controlled variable I according to the following equation (5) and outputs to the control valve 2. In other words, the control unit 34 outputs the valve controlled variable I to the control valve 2 so as to gradually reach toward the target valve controlled variable $I_n$ with a prescribed variation $\Delta i$ per prescribed unit time (1 cycle).

$$I = I_{n-1} + \Delta i \quad (5)$$

(step 113)

Effects of this embodiment is described below with reference to FIGS. 6A, 6B and 6C.

Figure 6A:
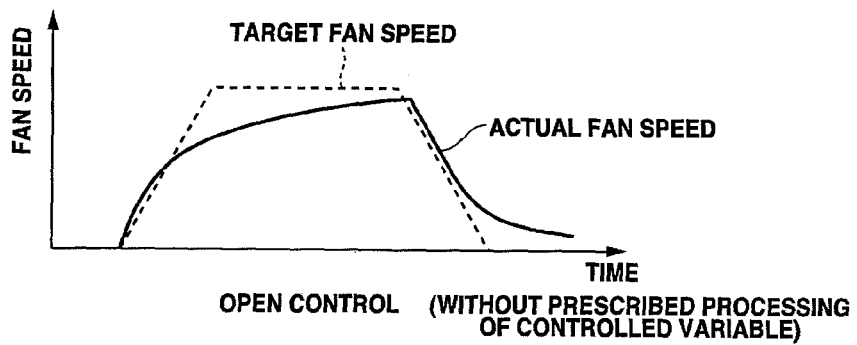
FIGS. 6A, 6B and 6C are graphs showing control characteristics of the embodiment and control characteristics of comparative examples in contrast with mutually.
Figure 6B:
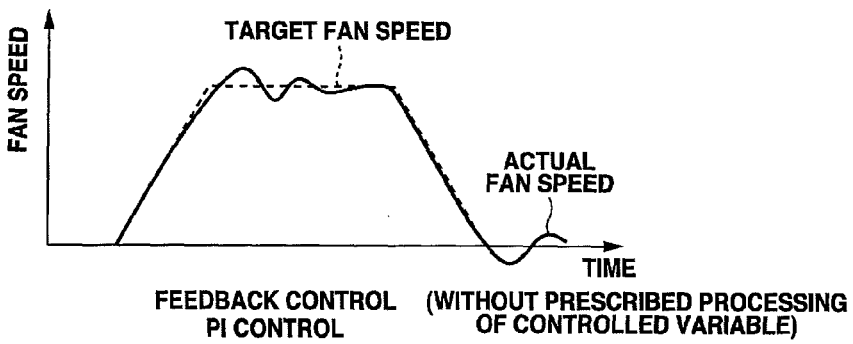
Figure 6C:
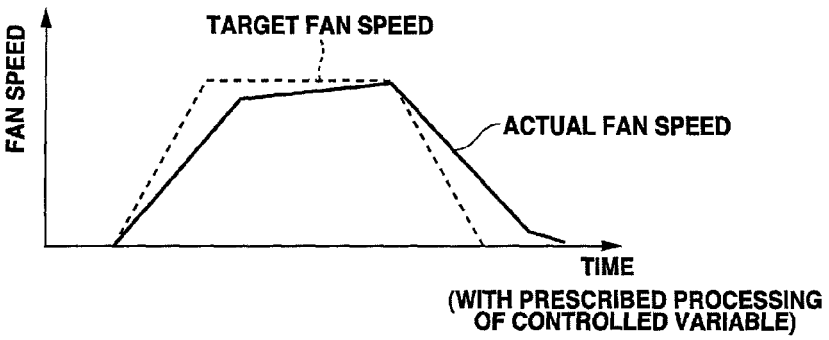

FIGS. 6A, 6B and 6C show control characteristics of the embodiment and those of comparative examples in contrast with each other. In the drawings, broken lines indicate the target fan speed Nt, and solid lines indicate the actual fan speed Nd. FIGS. 6A, 6B and 6C show cases that the target fan speed Nt has changed in a trapezoidal shape.

FIG. 6A shows the control characteristics of the comparative example. FIG. 6A shows the control characteristics when the fan speed is controlled by open-loop control to match with the target fan speed without fixing a variation per unit time. It is seen from FIG. 6A that the fan speed can not be matched with the target value by the open-loop control.

FIG. 6B shows the control characteristics of the comparative example. FIG. 6B shows the control characteristics in a case where the fan speed is controlled to match with the target fan speed by the feedback control and PI control. As shown in FIG. 6B, the control deviation is actively eliminated by the feedback control and the PI control, and the fan speed can be matched exactly with the target value with good controllability without causing a steady-state deviation even if there is disturbance. But, when the feedback control and the PI control are merely applied to control the fan speed, it is seen that overshooting occurs, and peak pressure or pressure hunting tends to occur easily in the hydraulic circuit.

FIG. 6C shows control characteristics of the embodiment. According to this embodiment, when the actual fan speed of the hydraulically driven fan 4 is controlled to the target fan speed, it can be matched exactly with the target speed. And, when a variation per unit time is fixed, a large change (large change of the swash plate 1a of the hydraulic pump 1) in the control valve 2 is eliminated, and thus it is possible to inhibit overshooting from occurring, and peak pressure or pressure hunting from occurring in the hydraulic circuit.

Regarding the above-described embodiment, various modifications can be carried out.

In the above-described embodiment, the control unit 34 outputs the valve controlled variable I to the control valve 2 so as to gradually reach toward the target valve controlled variable $I_n$ with a prescribed variation $\Delta i$ per prescribed unit time (1 cycle) as expressed by the above equation (5) ($I=I_{n-1}+\Delta i$) (step 113 in FIG. 5), but the control unit 34 is appropriate when it outputs the valve controlled variable I to the control valve 2 so that the control valve 2 reaches the target valve controlled variable $I_n$.

In the above embodiment, when it is judged that the difference $\Delta I$ between the target valve controlled variable $I_n$ and the actual valve controlled variable $I_{n-1}$ is not smaller than the predetermined threshold A (judged NO in step 110 in FIG. 5), the integration stop request command is outputted to turn off the integral valid flag (step 111 in FIG. 5) so as to stop the integral action, but it is also possible to continuously use the integral action regardless of whether or not the difference $\Delta I$ is not smaller than the predetermined threshold A. In other words, it is also possible that the PI control is continuously performed to calculate the fan speed command Nf according to the above equation (2) ($Nf=Nt+Kp\cdot\epsilon+Ki\cdot\int\epsilon$), the target valve controlled variable $I_n$ is calculated according to the calculated fan speed command Nf, and the valve controlled variable I is outputted to the control valve 2 so as to gradually reach toward the target valve controlled variable $I_n$ with a prescribed variation $\Delta i$ per prescribed unit time (1 cycle) as expressed by the above equation (5) ($I=I_{n-1}+\Delta i$) (step 113 in FIG. 5).

In the above embodiment, it is judged whether or not the integral control is performed by judging whether the difference $\Delta I(I_n-I_{n-1})$ between the target valve controlled variable $I_n$ and the actual valve controlled variable $I_{n-1}$ is smaller than the predetermined threshold A or not smaller than the predetermined threshold A (step 110 in FIG. 5). But it may be judged "whether the difference $\Delta I(I_n-I_{n-1})$ between the target valve controlled variable $I_n$ and the actual valve controlled variable $I_{n-1}$ is smaller than the predetermined threshold A or not smaller than the predetermined threshold A" according to another judgment method without directly determining the difference $\Delta I(I_n-I_{n-1})$ between the target valve controlled variable $I_n$ and the actual valve controlled variable $I_{n-1}$.

Figure 7:
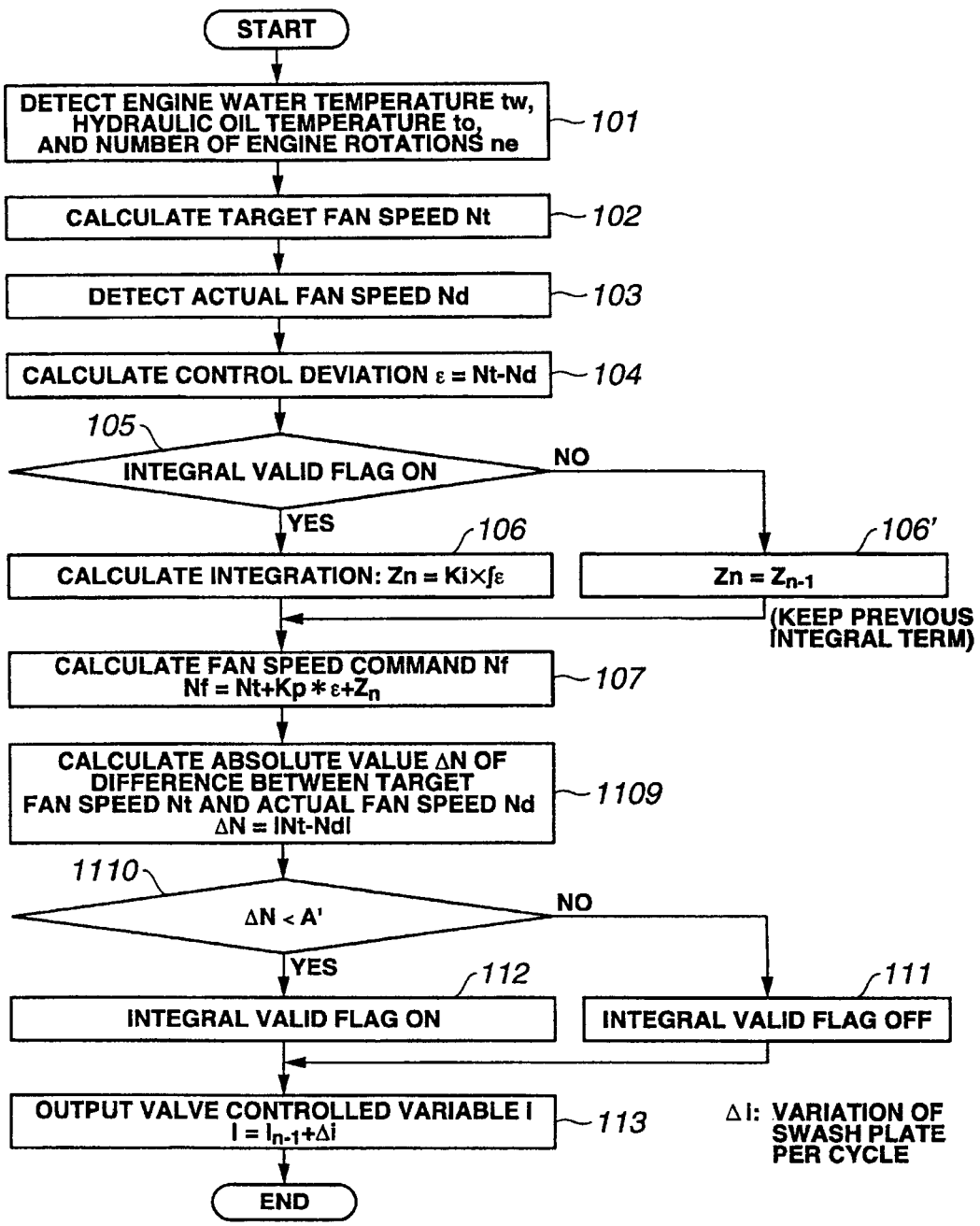
FIG. 7 is a flow chart of executing judgment processing different from FIG. 5.

FIG. 7 is a control flow chart similar to that shown in FIG. 5, showing another embodiment of judging whether or not the integral control is performed by another judgment method. In FIG. 7, since portions which are allotted with the same step numbers as those in FIG. 5 have the same contents as those in FIG. 5, their descriptions are omitted. In FIG. 7, the processings of the following steps 1109 and 1110 are performed instead of steps 108, 109 and 110 of FIG. 5.

Specifically, an absolute value $\Delta N$ of the difference between the target fan speed Nt and the actual fan speed Nd is calculated as expressed by the following equation (7):

$$\Delta N=|N-Nd| \qquad (7)$$

(step 1109).

Then, it is judged whether the absolute value $\Delta N$ of the difference between the target fan speed Nt and the actual fan speed Nd is smaller than a predetermined threshold A', or not smaller than the predetermined threshold A' as expressed by the following equation (8).

$$\Delta N=|Nt-Nd|<A' \qquad (8)$$

(step 1110)

As a judged result, when it is judged that the absolute value $\Delta N$ of the difference between the target fan speed Nt and the actual fan speed Nd is not smaller than the predetermined threshold A' (judged NO in step 1110), the integration stop request command is outputted to the fan rotation PI control portion 37 to turn off the integral valid flag (step 111).

On the other hand, when it is judged that the absolute value $\Delta N$ of the difference between the target fan speed Nt and the actual fan speed Nd is smaller than the predetermined threshold A' (judged YES in step 1110), the integration stop cancel command is outputted to the fan rotation PI control portion 37 to turn on the integral valid flag (step 112).

Figure 8:
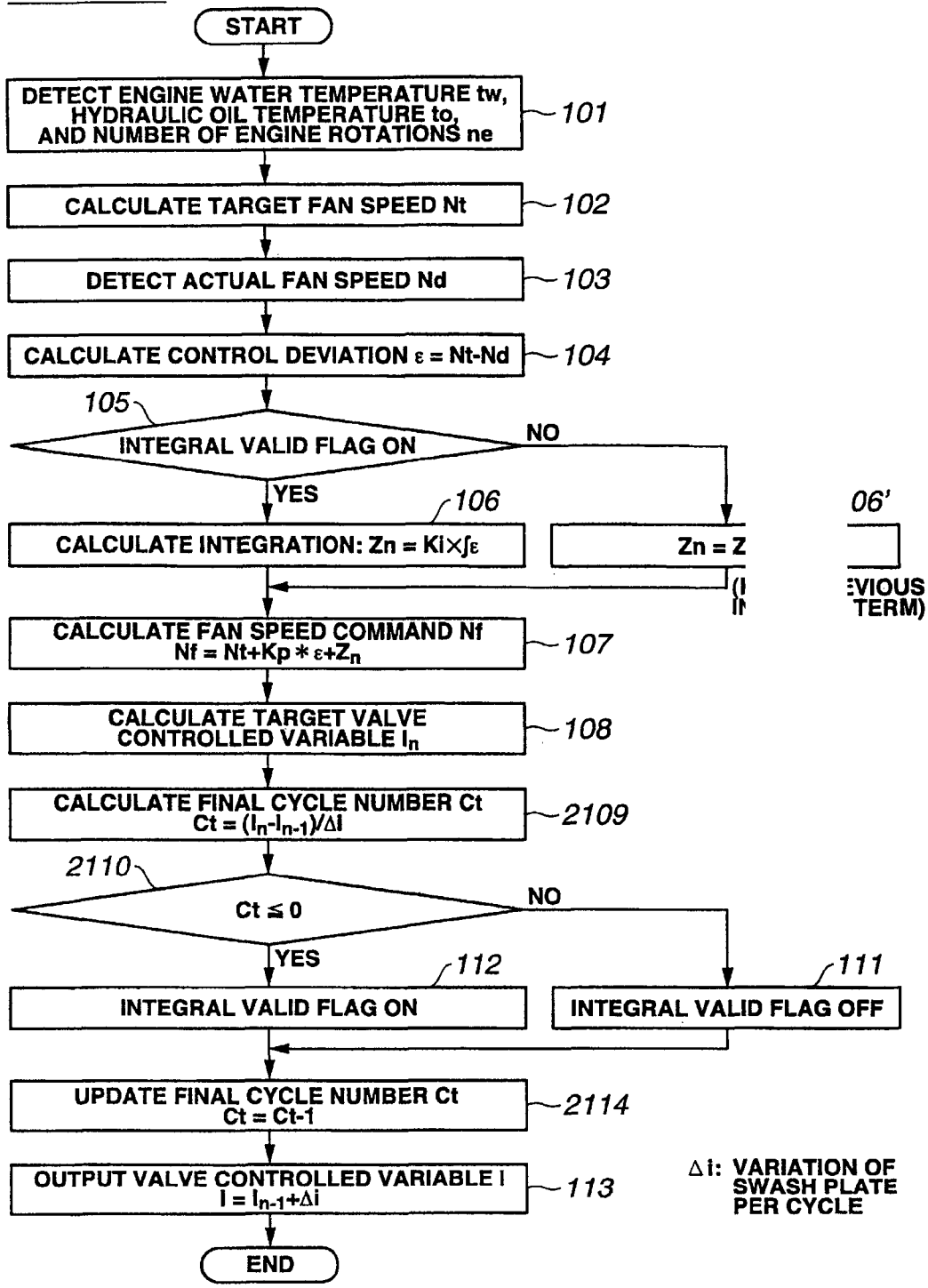
FIG. 8 is a flow chart of executing judgment processing different from FIG. 5 and FIG. 7.

FIG. 8 is a control flow chart similar to those of FIG. 5 and FIG. 7, showing another embodiment in which it is judged by a judgment method different from those of FIG. 5 and FIG. 7 whether or not the integral control is performed. In FIG. 8, since portions which are allotted with the same step numbers as those in FIG. 5 have the same contents as those in FIG. 5, their descriptions are omitted. In FIG. 8, the processings of the following steps 2109 and 2110 are performed instead of steps 109 and 110 of FIG. 5. And the processing of the following step 2114 is performed between steps 111 and 112, and step 113.

Specifically, final cycle number Ct to reach the target valve controlled variable $I_n$ is calculated as expressed by the following equation (9), $$Ct=(I_n-I_{n-1})/\Delta i \qquad (9).$$

The final cycle number Ct is a cycle number showing how many cycles remain to reach the target valve controlled variable $I_n$ when it is controlled to vary the valve controlled variable I of the control valve 2 by the prescribed variation $\Delta i$ per cycle at a time according to the equation (5) ($I=I_{n-1}+\Delta i$) in step 113 (step 2109).

Subsequently, it is judged whether the final cycle number Ct is larger than the predetermined threshold 0 or not larger than the predetermined threshold 0 as expressed by the following equation (10).

$$Ct \leq 0 \qquad (10)$$

(step 2110)

When it is judged as a result that the final cycle number Ct is more than the predetermined threshold 0 (judged NO in step 2110), the integration stop request command is outputted to the fan rotation PI control portion 37 to turn off the integral valid flag (step 111).

Meanwhile, when it is judged that the final cycle number Ct is not more than the predetermined threshold 0 (judged YES in step 2110), the integration stop cancel command is outputted to the fan rotation PI control portion 37 to turn on the integral valid flag (step 112).

Then, the final cycle number Ct is subtracted by 1 according to the following equation (11) to update the final cycle number Ct (step 2114).

$$Ct=Ct-1 \qquad (11)$$

The control unit 34 outputs the valve controlled variable I to the control valve 2 so as to reach gradually toward the target valve controlled variable $I_n$ according to the above equation (5) ($I=I_{n-1}+\Delta i$) with a prescribed variation $\Delta i$ per prescribed unit time (1 cycle) (step 113).

It was assumed in the above-described embodiments that the fan speed Nd detected by the fan speed sensor 4a is feedback quantity, but it may be a controlled variable which indicates an actual fan speed Nd. And it is also possible to perform the feedback control using a temperature, a flow rate, a pressure change and the like as feedback quantity.

In the above-described individual embodiments, it was described assuming that the PI control was performed but D (derivative) control was not performed. But, it is appropriate when at least the PI control is performed, and it is also possible to perform PID (proportional, integral and derivative) control.

In the above-described embodiments, the control methods of the variable displacement fan pump were described, but it is also possible to perform the same control by using a variable displacement fan motor.

INDUSTRIAL APPLICABILITY

When the actual fan speed of the hydraulically driven fan is controlled to the target fan speed, the present invention can exactly match the actual fan speed with the target speed and can also suppress the occurrence of peak pressure or pressure hunting in the hydraulic circuit and has high applicability industrially.

The invention claimed is:

1. A control device of a hydraulically driven fan provided with a hydraulic motor, a hydraulically driven fan driven by the hydraulic motor and a control valve for varying a flow rate of a hydraulic oil supplied to the hydraulic motor according to a valve controlled variable, wherein a fan speed command is feedback-controlled in a manner that at least a proportional action and an integral action are used with respect to a control deviation between a target fan speed and an actual fan speed of the hydraulically driven fan, the control device comprising:

first command value calculation means for calculating the fan speed command by using, from a proportional term and an integral term, only the proportional term only while a difference between a target valve controlled variable and an actual valve controlled variable is not smaller than a predetermined threshold, wherein the integral term is an intergration of the control deviation between the target fan speed and the actual fan speed, second command value calculation means for calculating the fan speed command by using both of the proportional term and the integral term while a difference between the target valve controlled variable and the actual valve controlled variable is smaller than the predetermined threshold, target valve controlled variable calculation means for calculating the target valve controlled variable of the control valve based on the calculated fan speed command, and control means for outputting the valve controlled variable to the control valve such that the control valve reaches the target valve controlled variable.

2. A control device of a hydraulically driven fan provided with a hydraulic motor, a hydraulically driven fan driven by the hydraulic motor and a control valve for varying a flow rate of a hydraulic oil supplied to the hydraulic motor according to a valve controlled variable to be added, comprising a calculation unit in which a fan speed command is feedback-controlled in a manner that at least a proportional action and an integral action, with respect to a control deviation between a target fan speed and an actual fan speed of the hydraulically driven fan, are used, target valve controlled variable calculation means for calculating a target valve controlled variable of the control valve based on the fan speed command, and control means for outputting the valve controlled variable to the control valve such that the control valve gradually reaches toward the target valve controlled variable with a prescribed variation per prescribed unit time.

3. A control device of a hydraulically driven fan provided with a hydraulic motor, a hydraulically driven fan driven by the hydraulic motor and a control valve for varying a flow rate of a hydraulic oil supplied to the hydraulic motor according to a valve controlled variable, wherein a fan speed command is feedback-controlled in a manner that at least a proportional action and an integral action are used with respect to a control deviation between a target fan speed an actual fan speed of the hydraulically driven fan, the control device comprising:

first command value calculation means for calculating the fan speed command by using, from a proportional term and an integral term, the proportional term only while a difference between a target valve controlled variable and an actual valve controlled variable is not smaller than a predetermined threshold, second command value calculation means for calculating the fan speed command by using both of the proportional term and the integral term while a difference between the target valve controlled variable and the actual valve controlled variable is smaller than the predetermined threshold, target valve controlled variable calculation means for calculating the target valve controlled variable of the control valve based on the calculated fan speed command, and control means for outputting the valve controlled variable to the control valve such that the control valve reaches the target valve controlled variable, wherein the control means outputs the valve controlled variable to the control valve such that the control valve gradually reaches toward the target valve controlled variable with a prescribed variation per prescribed unit time.

4. A control method for a hydraulically driven fan using a control device of a hydraulically driven fan which is provided with a hydraulic motor, a hydraulically driven fan driven by the hydraulic motor and a control valve for varying a flow rate of hydraulic oil to be supplied to the hydraulic motor according to an applied valve controlled variable, in which a fan speed command is feedback-controlled according to a control deviation between a target fan speed and an actual fan speed of the hydraulically driven fan, the method comprising:

a) calculating the target fan speed based on a temperature of cooling water of an engine, a temperature of oil of an oil cooler of the engine and a rotational speed of the engine, detecting the actual fan speed, and calculating a difference between the target fan speed and the actual fan speed as a control deviation, b) controlling the control valve by calculating a target valve controlled variable based on the target fan speed when the actual fan speed is zero, and calculating the valve controlled variable to gradually reach toward the calculated target valve controlled variable with a prescribed variation per prescribed unit time, c) calculating the fan speed command by using a proportional action based on the control deviation while the difference between the target valve controlled variable and an actual valve controlled variable is not smaller than a predetermined threshold,
d) calculating the fan speed command by using the proportional action and an integral action based on the control deviation while the difference between the target valve controlled variable and the actual valve controlled variable is smaller than the predetermined threshold, and
e) controlling the control valve by calculating the target valve controlled variable based on the calculated fan speed command and calculating the valve controlled variable to gradually reach toward the calculated target valve controlled variable with a prescribed variation per prescribed unit time.

5. The control method for a hydraulically driven fan according to claim 4, wherein in the step of calculating the target valve controlled variable is the target fan speed and the actual valve controlled variable is the actual fan speed.

6. The control method for a hydraulically driven fan according to claim 4, wherein:
a cycle number to gradually reach toward the calculated fan speed command with a prescribed variation per prescribed unit time is calculated,
the fan speed command is calculated by using the proportional action while the cycle number is larger than a predetermined threshold, and the fan speed command is calculated by using the proportional action and the integral action while the cycle number is not larger than the predetermined threshold, and
a final cycle number is updated by subtracting 1 from the cycle number when the cycle number is calculated.

* * * * *